United States Patent [19]

Williams

[11] Patent Number: 4,940,259
[45] Date of Patent: Jul. 10, 1990

[54] SWIVEL LUG PIPE JOINT CONNECTIONS
[75] Inventor: James H. Williams, Columbus, Ga.
[73] Assignee: Standard International, Inc., Columbus, Ga.
[21] Appl. No.: 322,520
[22] Filed: Mar. 13, 1989
[51] Int. Cl.⁵ .............................................. F16L 35/00
[52] U.S. Cl. ...................................... 285/3; 285/337; 285/404
[58] Field of Search ............... 285/337, 356, 404, 374, 285/90, 413, 414, 415, 3; 411/3, 5, 393, 537; 403/362; 24/237

[56] References Cited

U.S. PATENT DOCUMENTS

| | | |
|---|---|---|
| 571,220 | 11/1896 | Dresser . |
| 696,603 | 1/1902 | Smith . |
| 817,300 | 4/1906 | David . |
| 854,936 | 5/1907 | Dresser . |
| 944,748 | 12/1909 | Smith et al. . |
| 1,078,009 | 11/1913 | Taylor . |
| 1,098,299 | 5/1914 | Powell . |
| 1,185,745 | 6/1916 | Weismiller . |
| 1,345,334 | 6/1920 | Stafford . |
| 1,365,530 | 1/1921 | Moore . |
| 1,384,045 | 7/1921 | Burns . |
| 1,410,600 | 3/1922 | Roberts . |
| 1,434,952 | 11/1922 | Johnson . |
| 1,549,567 | 8/1925 | Baldwin . |
| 1,898,283 | 2/1933 | Bawden . |
| 1,951,034 | 3/1934 | Norton . |
| 1,979,141 | 10/1934 | Clark et al. . |
| 2,031,499 | 2/1936 | Norton . |
| 2,136,592 | 11/1938 | Mayer . |
| 2,140,939 | 12/1938 | Merrill et al. . |
| 2,220,986 | 11/1940 | Bartell . |
| 2,225,750 | 12/1940 | Martin . |
| 2,248,000 | 7/1941 | Johnson . |
| 2,249,658 | 7/1941 | Kemner . |
| 2,322,195 | 2/1958 | Hoke . |
| 2,328,031 | 8/1943 | Risley . |
| 2,328,168 | 8/1943 | Risley . |
| 2,415,753 | 2/1947 | Newell . |
| 2,641,490 | 6/1953 | Krapp . |
| 2,679,410 | 5/1954 | Boughton . |
| 2,842,383 | 7/1958 | Merrill . |
| 2,923,561 | 2/1960 | Merrill . |
| 2,969,995 | 1/1961 | Boughton . |
| 2,984,504 | 5/1961 | Boughton . |
| 2,992,022 | 7/1961 | Risley et al. . |
| 3,065,000 | 11/1962 | Stanton . |
| 3,333,872 | 8/1967 | Crawford et al. . |
| 3,415,547 | 12/1968 | Yano . |
| 3,726,549 | 4/1972 | Bradley, Jr. . |
| 3,812,757 | 5/1974 | Reiland ................... 411/5 |
| 4,092,036 | 5/1978 | Sato et al. . |
| 4,295,668 | 10/1980 | Louthan . |
| 4,417,754 | 11/1983 | Yamaji et al. . |
| 4,492,500 | 1/1985 | Ewing . |
| 4,544,188 | 10/1985 | Dugger . |
| 4,671,716 | 6/1987 | Grass . |
| 4,691,907 | 9/1987 | Yang . |

FOREIGN PATENT DOCUMENTS

| | | | |
|---|---|---|---|
| 84780 | 12/1954 | Netherlands ......................... | 411/393 |
| 6146 | of 1913 | United Kingdom ................ | 285/404 |
| 113394 | 2/1918. | United Kingdom ................ | 411/393 |
| 898026 | 6/1962 | United Kingdom ..................... | 411/3 |

OTHER PUBLICATIONS

FIG. 11.1 and Notes on p. 7 entitled "Rubber Gasket Joints".
Page No. "MJ-2" having at left top margin: U.S. Pipe Steps in Assembly of Mechanical Joint Pipe.
Page No. "MJ-3" having at left top margin: U.S. Pipe Standardized Mechanical Joint for Ductile Iron Pipe.

Primary Examiner—Dave W. Arola
Attorney, Agent, or Firm—Kilpatrick & Cody

[57] ABSTRACT

Pipe joint connections with set screws that have swivel-mounted feet. Such set screws when used with such connections flexibly and tenaciously retain pipe sections in the connections in the same manner that a toy "chinese puzzle" woven straw tube retains a person's fingers. The larger faces of such set screw feet allow the set screws to grip the pipe section with considerably less torque than that required by conventional set screws. Such connections form a flexible, strong coupling that maintains its holding power despite changes in pipe position and environmental factors such as temperature and pressure. Such connections are particularly well suited for joining polyvinyl chloride pipe sections to mechanical joint pipe fittings, valves and hydrants, although they are also extremely effective in joining conventional mechanical joint metal pipe sections to such attachments.

20 Claims, 6 Drawing Sheets

SWIVEL LUG PIPE JOINT CONNECTIONS

The present invention relates to pipe joint connections such as flanges, glands, and slip-on type joints having set screws or lugs for retaining spigot or other sections of pipe.

BACKGROUND OF THE INVENTION

Pipe joint connections of various types are well known for gripping pipe and forming couplings. Pipe joint glands, for example, have long been used to couple a plain or spigot end of pipe, such as water main, to a mechanical joint bell end of an adjacent pipe section or mechanical joint fittings, valves and hydrants (sometimes hereinafter, "attachments"). The bell end typically features an annular flange which contains a number of bolt holes. The bell end also typically contains a recess into which a portion of the spigot end of adjoining pipe fits. A pipe joint gland, which features an annular flange having bolt holes that correspond to the bolt holes in the adjoining bell end flange, is placed about the spigot end.

Pipe joint connections also feature means for gripping the pipe to retain it in position against the next fitting, pipe, valve or hydrant. Frequently such connections contain set screws for this purpose. Such set screws penetrate the connection in a direction generally perpendicular to the pipe axis to fasten the connection to the pipe.

A second gripping mechanism, commonly employed in glands (with or without use of set screws), is a sealing ring disposed in the bell end against which a contact face of the gland impinges. When the bolts connecting the bell end and the gland are torqued appropriately, the gland impinges on the sealing ring to force the ring against the spigot end and into the bell end in order to help form a fluid-tight seal and to grip the spigot end of the pipe. Such glands are shown in U.S. Pat. No. 4,544,188 issued Oct. 1, 1985 to Dugger which is incorporated herein by reference.

Mechanical joint pipe connections which use set screws typically entail certain disadvantages. First, the set screws typically feature a pointed or hollow-conical foot which can scar the pipe and which can create point stresses and thus eventual failure sites on the pipe. Second, conventional set screws rigidly attach the pipe to the connection and thus form a rigid coupling. Such rigidity is frequently undesirable for pipes placed in the earth, which require a degree of flexibility. Additionally, because of this rigid structure, the coupling has no ability to flex and adjust itself over time in order to maintain constant gripping power despite changes in temperature, pressure and other factors which can affect expansion and contraction of the pipe, set screws and connection.

SUMMARY OF THE INVENTION

Connections of the present invention employ novel set screws to address these problems. The set screws employ large, swivel-mounted feet which contact and grip the pipe section. Surprisingly, the inventor has found that such swivel-footed set screws employed in pipe joint connections tenaciously retain pipe sections in the same manner that the toy "chinese puzzle" woven straw tube retains a person's index fingers: the more one attempts to retract the finger, the more tenaciously the puzzle grips the finger. This appears to be the case because as the pipe section moves back and forth in the connection, the swivel-mounted feet rock or rotate with the pipe and wedge themselves against the pipe section with greater force.

The set screws, with their large feet, minimize scarring of the pipe and they require considerably less torque than conventional set screws to grip the pipe. Such connection-set screw structures allow the pipe to be retained flexibly within the connection. Such structures also allow the connection to maintain its grip on the pipe despite changes in pipe position over time and changes in environmental factors such as temperature and pressure.

The large feet of such set screws contain a socket or cavity which receives a ball-shaped swivel surface on the set screw shank. The foot is thus free to swivel or rotate on the ball. The inventor has found to his surprise that such set screws can, despite their structural complexity, withstand easily the compression and shear stresses which set screws encounter in mechanical pipe joint gland applications.

It is accordingly an object of the present invention to provide a pipe joint connection which flexibly retains pipe while imposing minimal point stress and scarring on pipe.

It is an additional object of the present invention to provide a pipe joint connection with set screws that have swivel-mounted feet to grip pipe.

It is an additional object of the present invention to provide pipe joint connections with set screws having swivel-mounted feet of large cross sectional area so that considerably less torque is required on the set screws to allow the connections to grip the pipe.

It is an additional object of the present invention to provide pipe joint connections which may be flexibly mounted to pipe and maintain their gripping power despite changes in pipe position and environmental factors such as temperature and pressure.

Other objects, features and advantages of the present invention will become apparent in the remainder of this document.

DETAILED DESCRIPTION OF THE DRAWINGS

Figure 1:
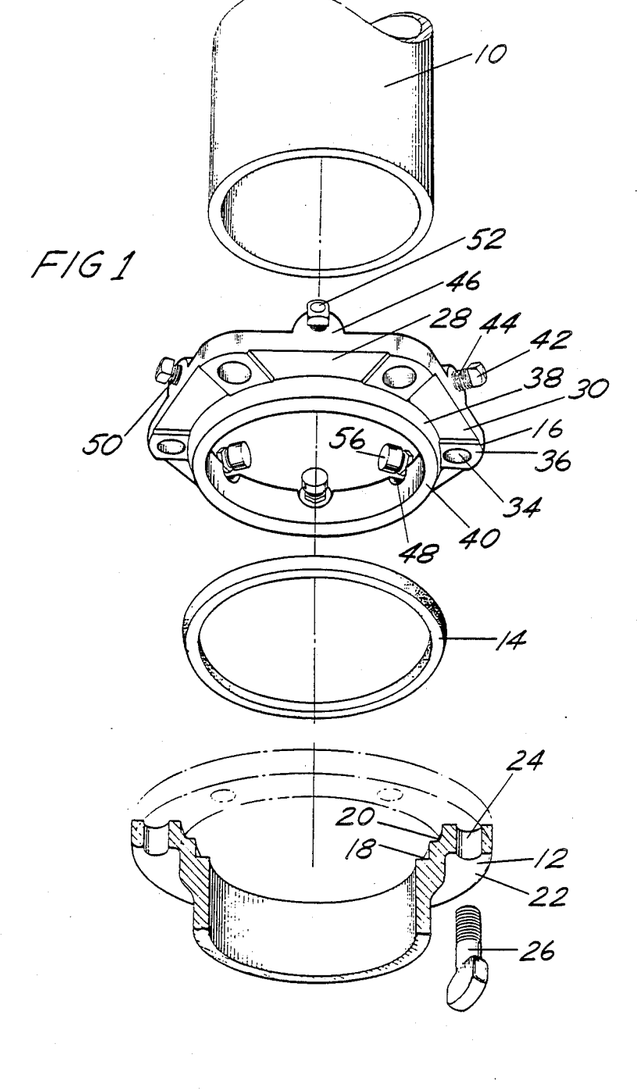
FIG. 1 an exploded perspective view of pipe components, a seal and a connection according to the present invention.

FIG. 1 shows, in an exploded perspective view, a pipe spigot end 10 coupled to a corresponding pipe bell end 12 using a sealing ring 14 and a connection in the form of gland 16 according to the present invention. Swivel lug connections of the present invention may also be used in applications other than simply coupling spigot ends to bell ends of pipe as those terms are conventionally defined; they may be flanges, slip-on type joints, or other devices for coupling pipe, and they may be used on fittings, valves, hydrants or other attachments. Accordingly, although connections are described herein with reference to glands for spigot ends of pipe for convenience and illustration, such description of the preferred embodiment should not be construed to limit the scope of the present invention. Such connections will be likewise described with reference to a "pipe section," which should be construed to include portions of attachments.

Bell end 12 as shown in FIG. 1 contains an annular recess 18 into which spigot end 10 fits. A second annular recess 20 of bell end 12 receives sealing ring 14. Bell end 12 also features an axially disposed flange 22. The flange 22 contains a number of bolt holes 24 which receive bolts 26 for fastening bell end 12 to the gland 16.

The sealing ring 14 shown in FIG. 1 is formed of an elastic material and is generally configured to correspond to second annular recess 20 of bell end 12 as disclosed in U.S. Pat. No. 4,544,188 issued Oct. 1, 1985 to Dugger. Other sealing means may be utilized in connection with glands of the present invention, however, or they may be omitted.

Gland 16 generally comprises a web 28 which is disposed in a plane that is substantially perpendicular to the axis of the pipe section that is circumscribed by the gland 16 (and that is thus substantially perpendicular to the axis of the hole in gland 16 through which the pipe fits). Web 28 is generally a flat, hexagonal structure in the embodiment shown in FIG. 1 and, like other portions of the gland 16, is preferably formed of ductile iron. Web 28 has a forward face 30 which faces the bell end 12 when gland 16 is installed and a rear face 32 which faces away from bell end 12. A plurality of bolt holes 34 penetrate the web in a direction substantially perpendicular to the web plane. These bolt holes 34 correspond to bolt holes 24 of bell end 12 flange 22, and they receive bolts 26 which connect or fasten bell end 12 flange 22 to gland 16. Bolt holes 34 may be reinforced by bosses formed on the forward face 30 (and, if desired, on the rear face 32) of web 28 in the vicinity of bolt holes 34.

Gland 16 in the embodiment shown in FIG. 1 also features an axial wall 38 which extends in cylindrical fashion from the forward face 30 of web 28. Axial wall 38 in turn features a contact surface 40 which is preferably disposed at a shallow angle to the plane of web 28. Axial wall 38 fits into bell end 12 while contact surface 40 is shaped to force sealing ring 14 into second annular recess 20 of bell end 12 optimally to grip spigot end 10 and seal the coupling between spigot end 10 and bell end 12. Axial wall 38 and contact surface 40 may be omitted where gland 16 need only grip a pipe section and not perform any sealing function.

Figure 2:
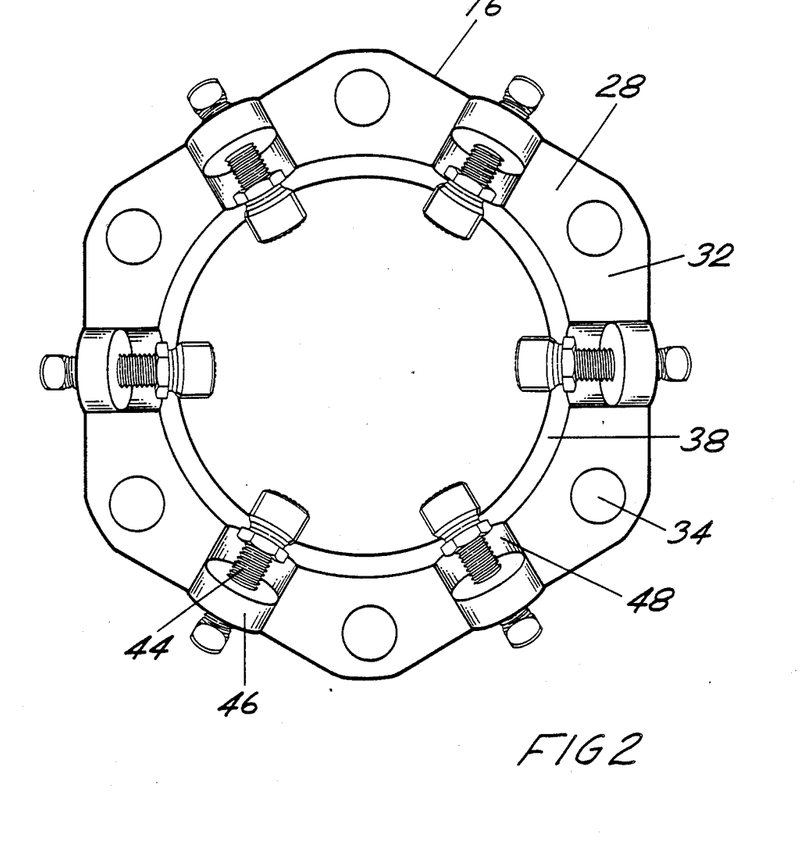
FIG. 2. is a plan view of the rear, non-wall face of the gland of FIG. 1.
Figure 3:
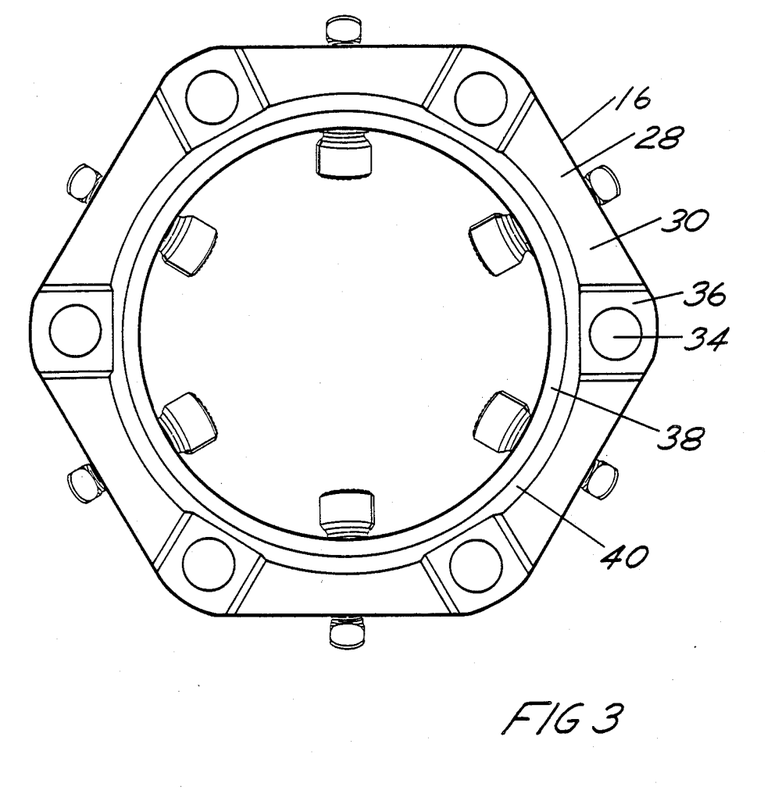
FIG. 3 is a plan view of the forward, wall face of the gland of FIG. 1.

The rear face 32 of gland 16 (or web 28) features provision for set screws 42. In the embodiment shown in FIG. 1, set screws 42 are disposed in web 28 in threaded openings 44 whose axes are substantially parallel to the plane of web 28. Openings 44 are reinforced on the rear face 32 of web 28 by set screw bosses 46 in the preferred embodiment, although such bosses are not required. Set screw openings 44 may also be disposed at any desired angle relative to the plane of web 28. The inventor has found, to his surprise, that openings 44 oriented parallel to that plane (within a few degrees) perform optimally; torquing of the set screws 42 provides minimal pipe scarring in this configuration and the screws 42 seem to lose none of their gripping power. Angling the set screws to any substantial degree, by contrast, causes the swivel-mounted feet to dig into the pipe as the set screws are torqued. Web 28 as shown in FIG. 1 also features recesses 48 located in forward face 30 generally coaxially with set screw openings 44. Such recesses 48 are of diameter larger than the set screw opening 44 diameters to receive some or all of the large feet of set screws 42. Such recesses 48 are shown perhaps more clearly in FIG. 2.

Figure 4:
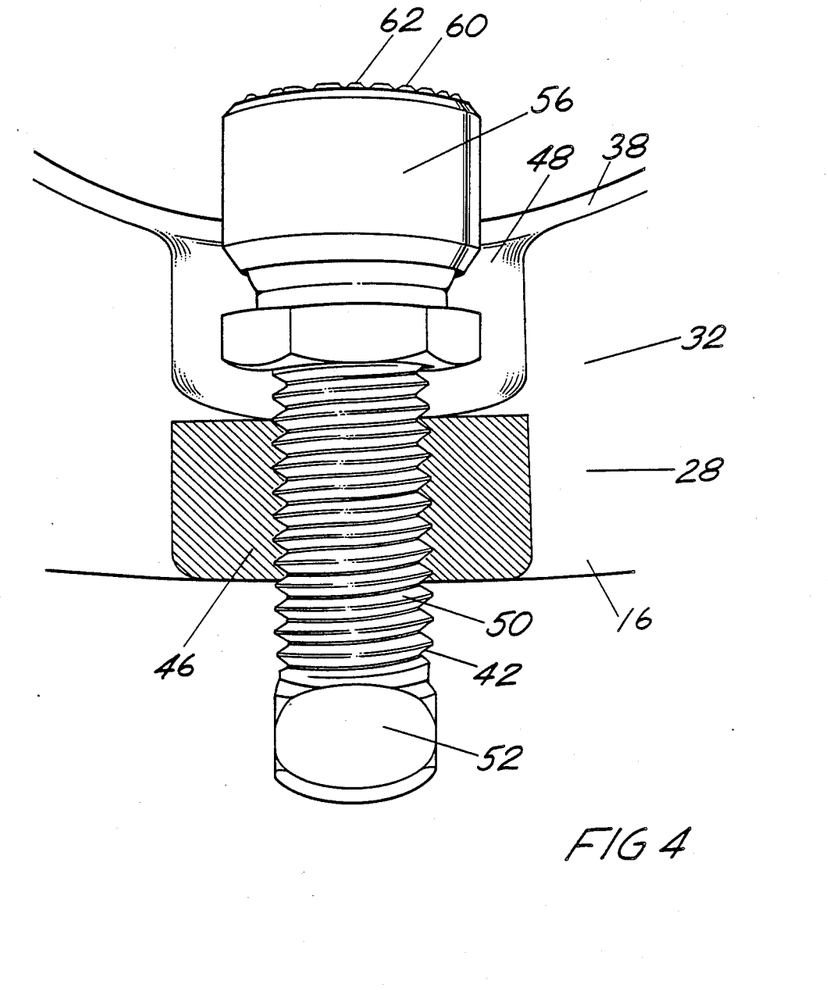
FIG 4 is a partial cross-sectional view of a portion of the gland FIG. 1 showing placement of a set screw.

FIG. 4 shows such recesses 48, together with set screw bosses 46, threaded set screw openings 44 and set screws 42, in greater detail. Set screws 42 generally comprise a threaded shank 50 whose threads are received in set screw openings 44. Shank 50 is connected to a head 52 for receiving a wrench or other torquing means. Head 52 may in turn be connected to a conventional snap-off fitting (not shown) which fails upon application of a predetermined torque for accurate torquing of set screws 42.

Shank 50 of each set screw 42 is also connected to a generally ball-shaped swivel surface 54. Swivel surface 54 in the embodiment shown in FIG. 1 is of diameter larger than that of shank 50; its diameter may be smaller than that of shank 50 or any other desired size or shape to receive a set screw foot 56 in swivel or rotatable fashion.

Figure 5:
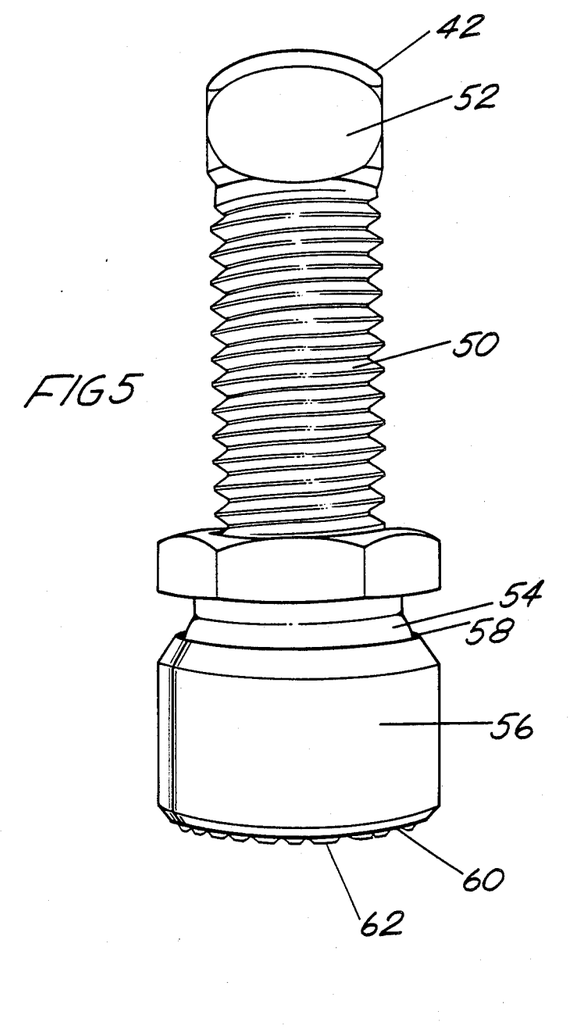
FIG. 5 is elevational view of a set screw of the present invention.
Figure 6:
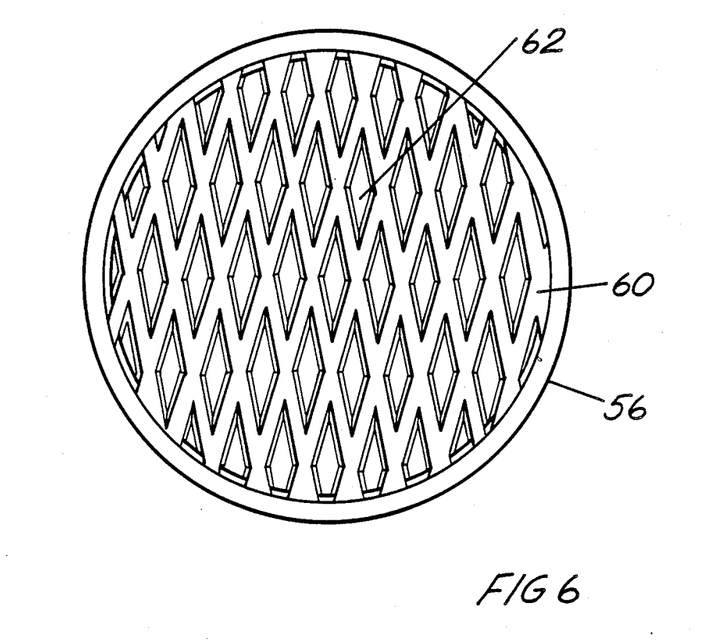
FIG 6 is a plan view of the face of a set screw foot according to the present invention.

Swivel surface 54 and foot 56 are shown perhaps more clearly in FIG. 5. Foot 56 is preferably a generally cylindrically shaped fitting which contains a socket or cavity 58 that generally conforms in size and shape to swivel surface 54 in order to allow foot 56 to swivel or rotate on swivel surface 54. Lubrication may be used as desired. Foot 56 also contains a face 60 which grips spigot end 10. Face 60 is preferably generally planar. Its friction coefficient may be increased by machining, engraving or otherwise forming irregularities on its surface. FIG. 6 shows engravings 62 which comprise raised portions left after face 60 is engraved. The inventor has found that diamond-shaped engravings 62 perform well when gripping ductile iron pipe, in the manner that diamond-shaped engravings on pipe vise jaws grip pipe.

The inventor has found that glands 16 of the present invention are particularly well suited for gripping PVC (polyvinyl chloride) or other plastic pipe when connected to mechanical joint fittings. He has found that set screws 42 of such glands require only approximately one-third of the torque required with conventional gland-set screw configurations to form a coupling that withstands pressures equivalent to pressures withstood by conventional glands. The larger faces 60 of swivel mounted set screw feet 56 do not punch through the pipe as do conventional set screws, yet they maintain more than adequate friction against the spigot end 10 to tenaciously hold spigot end 10 as hydrostatic and hydrodynamic pressure forces spigot end 10 away from bell end 12. Indeed, the inventor has found in a number of tests that the pipe section itself bursts before the coupling formed with gland 16 fails, using PVC pipe. It should be clearly understood, however, that glands 16 of the present invention also work extraordinarily well with conventional mechanical joint ductile iron or other pipe sections.

EXAMPLE

As an example, sample test joints were constructed utilizing a short length of class 100 AWWA C-900 PVC pipe. Two end caps were attached to the pipe by using a gland according to the present invention on one end and a conventional retainer gland on the other end. One end cap was fitted with a valve for venting of air, while the other was tapped for attachment of a hydrostatic pressure pump. This trial was conducted at a temperature of approximately 50° fahrenheit.

A torque value of 75 foot pounds was applied to the T-bolts which attach the end caps to the glands, in accordance with A.S.A. A-21.1. The set screws on the gland of the present invention were tightened to 35 foot pounds while the torque on the set screws of the conventional retainer gland were tightened to 80 foot pounds. The sample was filled with water, vented of entrapped air, and subjected to a gradually increasing pressure in increments of 50 psi until failure occurred.

The following results were obtained:

| Pressure | Time Held | Remarks |
|---|---|---|
| 0–50 | 2 minutes | No leaks, No Movement |
| 100 | " | " |
| 150 | " | " |
| 200 | " | " |
| 250 | " | " |
| 300 | " | " |
| 350 | " | " |
| 400 | " | " |
| 450 | " | " |
| 500 | " | " |
| 525 | None | Pipe burst into many pieces at conventional retainer gland end. |

The results show that the pipe burst at the conventional retainer gland end. Indeed, the pipe broke where set screws of the conventional gland had penetrated partially through the wall of &:he pipe. An extrapolation of this test data suggests that retainer glands of the present invention will hold properly on pressures: up to 985 psi on class 200 PVC C-900 pipe if additional torque is placed on the set screws.

The foregoing is provided for purposes of illustration and explanation. Modifications may be made to the embodiment disclosed and depicted herein without departing from the spirit and scope of the invention.

What is claimed is:

1. A pipe joint connection for forming a coupling between a pipe section and an attachment, comprising:
   (a) a web adapted to surround the pipe section in a plane substantially perpendicular to the pipe section axis, for being connected to the attachment to form the coupling;
   (b) a plurality of threaded set screw openings oriented toward the pipe section formed circumferentially substantially equidistant from each other on the web; and
   (c) a plurality of set screws, each disposed in a set screw opening, and each comprising:
      (i) a threaded shank whose threads cooperate with the threads in the set screws openings;
      (ii) a head connected to the shank for receiving a torquing means;
      (iii) a substantially convex, curved shaped swivel surface connected to the shank; and
      (iv) a swivel foot having a cavity to receive the swivel surface to allow the foot to swivel on the swivel surface and a grip face to allow the set screw to grip the pipe section.

2. A pipe joint connection according to claim 1 in which the set screw openings are oriented substantially perpendicular to the pipe section axis.

3. A pipe joint connection according to claim 1 in which the set screw grip faces are engraved to increase the friction between the set screw faces and the pipe section.

4. A pipe joint connection according to claim 3 in which the set screw grip face engravings are diamond-shaped.

5. A pipe joint connection according to claim 1 in which the set screws additionally comprise a snap-off fitting attached to the head.

6. A pipe joint connection according to claim 1 in which the face of each set screw swivel foot is larger than the cross sectional area of the set screw shank.

7. A pipe joint connection according to claim 1 in which a plurality of bolt holes are formed in the web circumferentially substantially equidistant from each other and substantially parallel to the pipe section axis.

8. A pipe joint connection according to claim 1 further comprising a generally axial wall which is connected to the interior margin of the web and adapted to surround a portion of the pipe section.

9. A pipe joint connection according to claim 1 further comprising an elastic seal annular contact face formed on the end of the wall away from the web.

10. A pipe joint connection for forming a coupling between a pipe section and an attachment comprising:
    (a) a web adapted to surround the pipe section in a plane substantially normal to the pipe section axis, for being connected to the attachment to form the coupling;
    (b) a generally axial wall connected to the interior margin of the web and adapted to surround a portion of the pipe section;
    (c) an elastic seal annular contact face formed on the end of the wall away from the web;
    (d) a plurality of bolt holes formed in the web circumferentially substantially equidistant from each other and substantially parallel to the pipe section axis;
    (e) a plurality of threaded set screw openings oriented toward the pipe section formed circumferentially substantially equidistant from each other on the web; and
    (f) a plurality of set screws, each disposed in a set screw opening, and each comprising:
       (i) a threaded shank whose threads cooperate with the threads in the set screw openings;
       (ii) a head connected to the shank for receiving a torquing means;
       (iii) a substantially curved, convex shaped swivel surface connected to the shank; and
       (iv) a swivel foot having a cavity to receive the swivel surface to allow the foot to swivel on the swivel surface and a grip face to allow the set screw to grip the pipe section.

11. A pipe joint connection according to claim 10 in which the set screw openings are oriented substantially perpendicular to the pipe section axis.

12. A pipe joint connection according to claim 10 in which the set screw faces are engraved to increase the friction between the set screw faces and the pipe section.

13. A pipe joint connection according to claim 12 in which the set screw face engravings are diamond-shaped.

14. A pipe joint connection according to claim 10 in which the set screws additionally comprise a snap-off fitting attached to the head.

15. A pipe joint connection according to claim 10 in which the face of each set screw swivel foot is larger than the cross sectional area of the set screw shank.

16. A pipe joint gland for forming a fluid seal between mechanical joint bell and interfitting pipe sections, comprising:
   (a) a web adapted to surround a first of the pipe sections in a plane substantially perpendicular to the pipe section axis;
   (b) a plurality of threaded set screw openings oriented toward the pipe section formed circumferentially substantially equidistant from each other on the web; and
   (c) a plurality of set screws, each disposed in a set screw opening, and each comprising:
      (i) a threaded shank whose threads cooperate with the threads in the set screw openings;
      (ii) a head connected to the shank for receiving a torquing means;
      (iii) a substantially ball-shaped swivel surface connected to the shank; and
      (iv) a swivel foot having (x) a cavity to receive the swivel surface to allow the foot to swivel on the swivel surface and (y) a grip face of area larger than the cross sectional area of the set screw shank to allow the set screw to grip the pipe section.

17. A pipe joint gland according to claim 16 in which the set screw openings are oriented substantially perpendicular to the pipe section axis.

18. A pipe joint gland according to claim 16 in which the set screw faces are engraved to increase the friction between the set screw faces and the pipe section.

19. A pipe joint gland according to claim 18 in which the set screw face engravings are diamond-shaped.

20. A pipe joint gland according to claim 16 in which the set screws additionally comprise a snap-off fitting attached to the head.

* * * * *